(12) United States Patent
Krauter et al.

(10) Patent No.: US 7,359,194 B2
(45) Date of Patent: Apr. 15, 2008

(54) DEVICE AND METHOD FOR COOLING AN ELECTRONICS UNIT

(75) Inventors: Jochen Krauter, Hildrizhausen (DE); Holger Frank, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/351,088

(22) Filed: Feb. 9, 2006

(65) Prior Publication Data

US 2006/0187635 A1 Aug. 24, 2006

(30) Foreign Application Priority Data

Feb. 18, 2005 (DE) .................. 10 2005 007 545

(51) Int. Cl.
| | |
|---|---|
| H05K 7/20 | (2006.01) |
| H02K 7/14 | (2006.01) |
| H02K 9/00 | (2006.01) |
| H02K 5/20 | (2006.01) |
| H02K 5/18 | (2006.01) |
| H02K 3/24 | (2006.01) |
| H02K 1/32 | (2006.01) |

(52) U.S. Cl. .................. 361/695; 361/690; 361/694; 310/50; 310/52; 310/58; 310/64

(58) Field of Classification Search ............... 361/695, 361/694, 690, 689, 688, 679, 678, 704, 692; 310/50, 52, 53, 58, 64; 340/693.5
See application file for complete search history.

(56) References Cited

U.S. PATENT DOCUMENTS

| 3,652,879 | A | * | 3/1972 | Plunkett et al. ............... 310/50 |
|---|---|---|---|---|
| 5,071,069 | A | * | 12/1991 | Stirm ......................... 239/128 |
| 6,127,751 | A | | 10/2000 | Kristen et al. |
| 6,325,157 | B1 | * | 12/2001 | Arakawa et al. ............ 173/201 |
| 6,455,186 | B1 | * | 9/2002 | Moores, Jr. et al. .......... 429/71 |
| 6,538,403 | B2 | * | 3/2003 | Gorti et al. ................. 318/254 |
| 6,552,904 | B2 | * | 4/2003 | Fung ......................... 361/704 |
| 6,602,122 | B1 | * | 8/2003 | Rudolf et al. ............... 451/344 |
| 6,682,320 | B2 | * | 1/2004 | Gold et al. ................. 417/368 |
| 6,776,245 | B2 | * | 8/2004 | Kristen et al. .............. 173/217 |
| 7,064,462 | B2 | * | 6/2006 | Hempe et al. ................ 310/50 |
| 2001/0033742 | A1 | * | 10/2001 | Weaver et al. ............. 388/800 |
| 2001/0043806 | A1 | * | 11/2001 | Gorti et al. ................. 388/800 |
| 2003/0030984 | A1 | | 2/2003 | Fung |
| 2003/0222516 | A1 | * | 12/2003 | Cleanthous et al. .......... 310/50 |
| 2004/0165353 | A1 | * | 8/2004 | Privett et al. ............... 361/704 |
| 2004/0182336 | A1 | * | 9/2004 | Ohmori et al. ........... 123/46 R |
| 2004/0263008 | A1 | | 12/2004 | Voigt et al. |
| 2006/0186743 | A1 | * | 8/2006 | Habel et al. ................. 310/58 |

* cited by examiner

*Primary Examiner*—Lisa Lea-Edmonds
*Assistant Examiner*—Anthony M Haughton
(74) *Attorney, Agent, or Firm*—Michael J. Striker

(57) ABSTRACT

A device for cooling an electronics unit, in particular a control electronics unit of a hand-held power tool, has an air-conducting device that directs at least a portion of an air stream exiting an electric motor to the electronic unit, while a method for cooling includes directing an air stream exiting the electric motor to the electronics unit.

14 Claims, 1 Drawing Sheet

DEVICE AND METHOD FOR COOLING AN ELECTRONICS UNIT

BACKGROUND OF THE INVENTION

The present invention relates to a device for cooling an electronics unit, and a corresponding method of cooling.

Devices for cooling electronics units are known from the related art. They involve both active and passive cooling techniques. Cooling using an air flow that has a temperature lower than that of the element to be cooled has proven particularly effective and economical. For many applications, it is sufficient to ventilate the element to be cooled, in particular an electronics unit, with ambient air supplied using a ventilator. This technique is also used frequently in hand-held power tools, such as an impact drill or a rotary hammer. With this technique, ambient air is drawn in (intake air flow) separately using a driven fan wheel and blown directly onto the element to be cooled. Although this technique has proven effective, it cannot be easily implemented in all hand-held power tools. Depending on the design of the hand-held power tool, undesired efforts are required in the design process to realize this cooling, or the cooling that is ideally desired/required cannot be realized with a given design.

SUMMARY OF THE INVENTION

With a device for cooling an electronics unit, in particular a control electronics unit of a hand-held power tool, according to the present invention, an air-conducting device that directs at least a portion of an air flow exiting an electric motor to the electronics unit is provided.

Due to the fact that the electronics unit is cooled by the air flow that has already cooled the electric motor of the hand-held power tool, the present invention forges a new path. Specifically, it was determined, surprisingly, that the air flow that has cooled the motor can still be cool enough to cool the electronics, even though it has a higher temperature than that of the ambient air. When supported with numbers used as examples, this can mean that, although the air flow that cools the motor was heated to 50° C. from an ambient temperature of 25° C., it can still be used to cool an electronics unit, the temperature of which should not exceed 75° C.

Based on this finding, completely new possibilities for designing and assigning the cooling of the electronics unit now become available. Since areas inside the hand-held power tool can now also be used that previously appeared unusable in terms of the ambient air flow required, it is easier to adjust the scale of the cooling power required. For example, the higher demand for cooling a cordless rotary hammer with 400 W compared to that of a cordless rotary hammer with 200 W can be easily achieved using a larger fan wheel, which can now be easily installed in the hand-held power tool due to the greater spacial flexibility and arrangement possibilities.

The electronics to be cooled are understood to be, in particular, the power control of the hand-held power tool, preferably pulse-width modulated control. Stated simply, the principle behind an electronics unit of this type is to supply only a metered portion of energy to the electric motor. This also means, however, that another portion creates dissipation heat, which results in the electronics unit heating up. The extent of the warming-up depends on the current/voltage and the layout of the electronics. The components of the electronics unit must not exceed a temperature defined in the component specification.

The air-conducting device advantageously includes a fan wheel, in particular a radial fan wheel. As a result, the air flow coming from the motor can be easily and economically forwarded, accelerated and/or redirected. The fan wheel can be driven by a separate fan motor if an independently regulatable fan output is desired.

With an advantageous embodiment of the present invention, the fan wheel is driven by a motor shaft of the motor. This eliminates the need to provide the fan wheel with a separate motor. With this embodiment, the drive power of the electric motor that is already provided is used to also drive the fan wheel. The power transmission from the motor shaft to the fan wheel can take place, in particular, via a rigid connection or at least one belt and/or at least one toothed wheel.

It is advantageous when the fan wheel is located on the motor shaft. Since the fan wheel is mounted fixedly, in particular, on the motor shaft, it is easy to manage the force transmission between the motor shaft and the fan wheel. In addition, movable parts are not required to transfer force and/or torque, thereby also reducing the likelihood of failure.

The fan wheel is preferably a motor fan wheel. The motor fan wheel—which was originally designed to help cool the motor—now also performs an additional task. This duplicate function results in a reduction in parts costs and, given an appropriate design, makes it possible to realize a more compact and/or lightweight design.

According to a refinement of the present invention, the air-conducting device includes at least one air guide element, in particular an air guide plate. As a result, the air flow can be prevented from flowing, uncontrolled, into the regions of the hand-held power tool that do not require cooling, and the air flow can be channeled in the direction of the electronics unit in a targeted manner. The air guide plate is assigned to the fan wheel in particular, to direct the air flow driven by the fan wheel. The air guide plate may also be operatively connected with a cooling device, e.g., a heat sink, to slightly cool down the air stream flowing to the electronics unit.

A cooling element, a cooling plate in particular, is advantageously assigned to the electronics unit. As a result, the thermal resistance between the electronics and the air flow coming from the motor can be reduced, to thereby improve the exchange of heat from the electronics unit into the air flow.

It is preferable that at least one air guide element simultaneously functions as a cooling element. Since a duplicate function then results, fewer components are required and, given an appropriate design, a more compact and/or lightweight design can be obtained.

An air outlet opening of the hand-held power tool is advantageously located in the direct vicinity of the electronics unit. The path of flow along which the air flow travels creates a certain amount of drag for the air flow. In addition to an aerodynamic design of the flow path, a short flow path, in particular, can reduce drag. This shortening can be easily attained using the stated arrangement of the air outlet opening.

The present invention also relates to a method for cooling an electronics unit, in particular a control electronics unit of a hand-held power tool, an air stream exiting an electric motor being directed to the electronics unit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
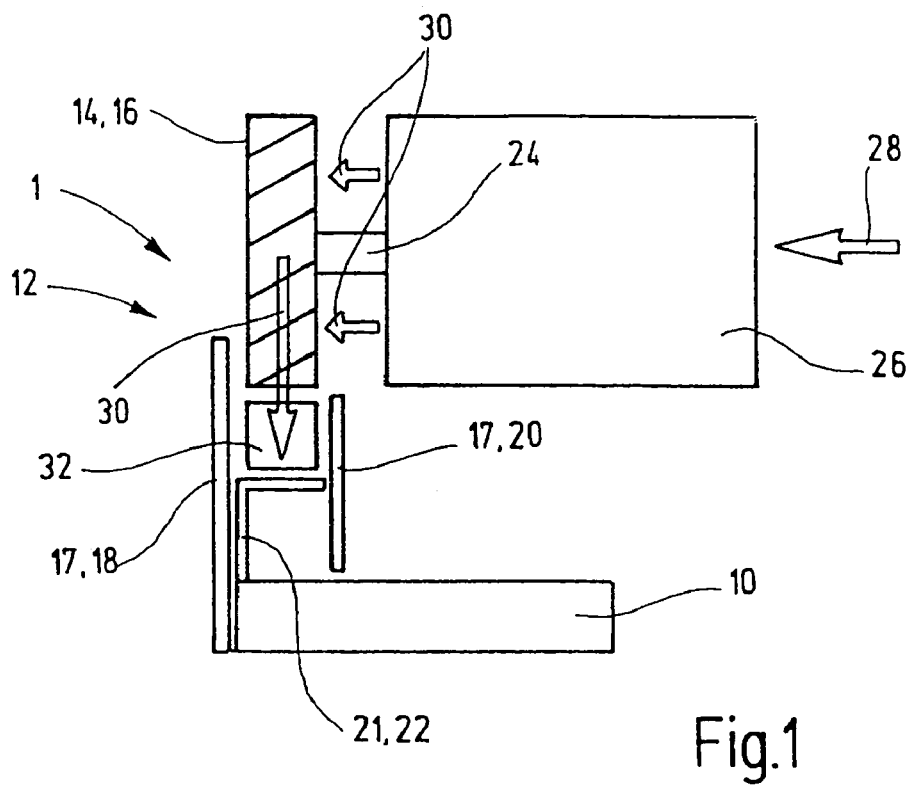
FIG. 1 Shows a first exemplary embodiment of a device for cooling an electronics unit in accordance with the present invention, and FIG. 2 Shows a second exemplary embodiment of a device for cooling an electronics unit in accordance with the present invention.

FIG. 1 is a schematic illustration of the design of device 1 for cooling an electronics unit 10. A device 1 of this type is used preferably in rotary hammers, in particular in cordless rotary hammers. Device 1 has an air-conducting device 12 which, in this exemplary embodiment, is composed of a fan wheel 14—a radial fan wheel 16 in this case—and a first and second air guide plate 18, 20 as air guide elements 17. A cooling element—a cooling plate 22 in this case—is advantageously assigned to electronics unit 10. Fan wheel 14 is non-rotatably mounted on a motor shaft 24 of an electric motor 26.

Device 1 operates as follows:

During operation, a rotor of motor 26 rotates, and an intake air flow 28 is drawn in, intake air flow 28 typically being drawn directly from the ambient air. Intake air flow 28 passes through motor 26, in this case essentially parallel with motor shaft 24, and exits the other side of motor 26 as warm air flow 30. Warm air flow 30 is drawn in by radial fan wheel 16 and conducted further radially to motor shaft 24. Via first and second air guide plate 18, 20, warm air flow 30 is directed to cooling plate 22 of electronics unit 10, flows along it (into the plane of the drawing in this case) and exits the not-shown hand-held power tool through an air outlet opening 32. The proposed design results in increased flexibility in terms of realizing device 1.

Figure 2:
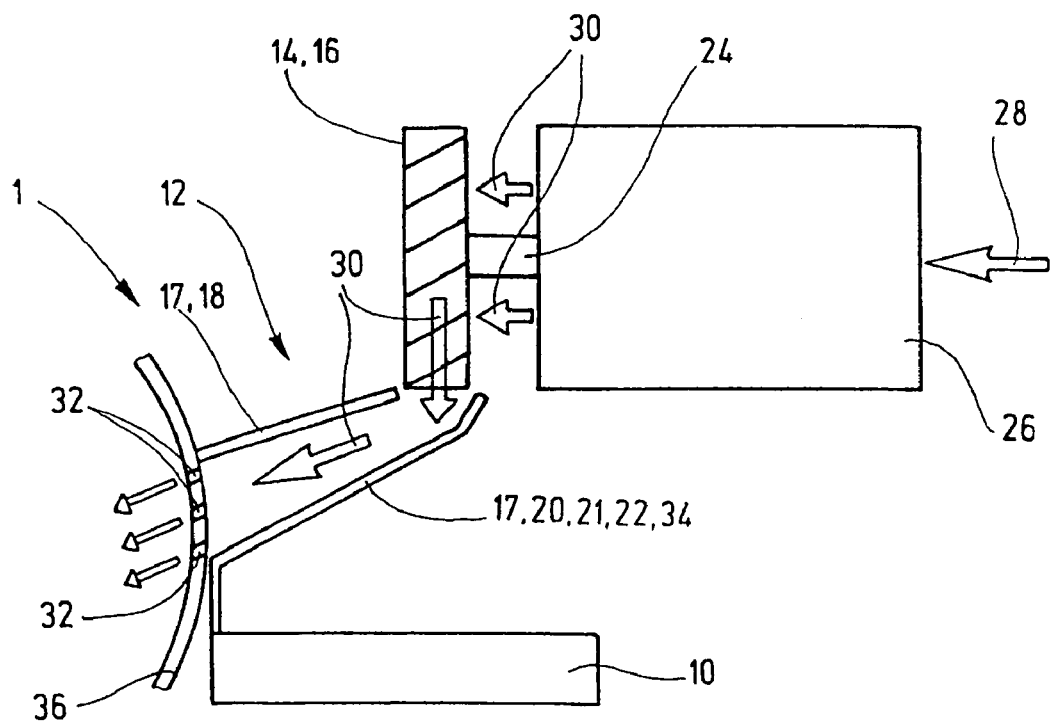

A second exemplary embodiment of a device 1 for cooling an electronics unit 10 is shown in FIG. 2. Reference is made to FIG. 1 with regard for the basic design, and the same reference numerals refer to the same elements. In contrast to FIG. 1, warm air flow 30 is redirected once more by air-conducting device 12 and, in fact, using an element 34, which performs the function of a second air guide plate 20 and a cooling plate 22. Warm air flow 30 then exits the hand-held power tool through air outlet openings 32 created in a wall 36 of a not-shown hand-held power tool.

Hand-held power tools with a device according to the present invention can be manufactured smaller in size and more economically. The amount of extra effort required for assembly and/or parts costs is slight or non-existent, since the air guide is integrated in the housing parts of the hand-held power tool. It is advantageous, in particular, to use a motor fan that is provided anyway.

It will be understood that each of the elements described above, or two or more together, may also find a useful application in other types of constructions differing from the types described above.

While the invention has been illustrated and described as embodied in a device and method for cooling electronics unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

The invention claimed is:

1. An arrangement, comprising an electric motor having a side from which an air stream that cooled said electric motor exits; an electronics unit; a cooling element assigned to the electronics unit; and a device for cooling the electronics unit, said device for cooling the electronics unit including an air-conducting device located between said side of said electric motor from which the air stream exits and said cooling element assigned to said electronics unit and configured to direct at least a portion of the air stream exiting the electric motor to said cooling element assigned to said electronics unit, so that at least the portion of the air stream that cooled said electric motor also cools said electronics unit.

2. An arrangement as defined in claim 1, wherein said air-conducting device is configured to direct said at least portion of said air stream exiting said electric motor to said cooling element assigned to said electronics unit formed as a control electronics unit of a hand-held power tool.

3. An arrangement as defined in claim 1, wherein said air-conducting device includes a fan wheel.

4. An arrangement as defined in claim 3, wherein said fan wheel of said air-conducting device is configured as a radial fan wheel.

5. An arrangement as defined in claim 3; and further comprising means for driving said fan wheel by a motor shaft of the electric motor.

6. An arrangement as defined in claim 3; and further comprising means for mounting said fan wheel on a motor shaft of the electric motor.

7. An arrangement as defined in claim 3, wherein said fan wheel is configured as a motor fan wheel of the electric motor.

8. An arrangement as defined in claim 1, wherein said air-conducting device includes at least one air guide element.

9. An arrangement as defined in claim 8, wherein said at least one air guide element of said air-conducting device is configured as an air guide plate.

10. An arrangement as defined in claim 1, wherein said cooling element is configured as a cooling plate.

11. An arrangement as defined in claim 1, wherein said cooling element is configured as at least one air guide element, so that said at least one air guide element functions simultaneously as the cooling element.

12. An arrangement as defined in claim 2, wherein the hand-held power tool has an air outlet opening located in a direct vicinity of the electronics unit.

13. A method of cooling an electronics unit, comprising the steps of providing an electric motor having a side from which an air stream that cooled said electric motor exits and a cooling element assigned to an electronics unit; and directing at least a portion of the air stream exiting the electric motor to the cooling element assigned to said electronics unit, so that at least the portion of the air stream that cooled said electric motor also cools said electronics unit.

14. A method as defined in claim 13, wherein said directing includes directing the air stream exiting the electric motor of a hand-held power tool to the cooling element assigned to the electronics unit formed as control electronics unit of the hand-held power tool.

* * * * *